(12) United States Patent
Pedersen

(10) Patent No.: US 6,651,874 B1
(45) Date of Patent: Nov. 25, 2003

(54) PACKING TRAY AND METHOD FOR ITS PRODUCTION AND USE

(76) Inventor: Steen Pedersen, Strandpromenaden 25, DK-6710 Esbjerg V (DK)

( * ) Notice: Subject to any disclaimer, the term of this patent is extended or adjusted under 35 U.S.C. 154(b) by 0 days.

(21) Appl. No.: 09/787,291

(22) PCT Filed: Sep. 15, 1999

(86) PCT No.: PCT/DK99/00488
§ 371 (c)(1),
(2), (4) Date: Jul. 5, 2001

(87) PCT Pub. No.: WO00/15431
PCT Pub. Date: Mar. 23, 2000

(30) Foreign Application Priority Data

Sep. 15, 1998  (DK) .......................... 1998 01160

(51) Int. Cl.⁷ .............................. B65D 5/20; B65B 51/10
(52) U.S. Cl. ................. 229/123.1; 53/478; 229/125.35; 229/407
(58) Field of Search ........................ 229/123.1, 125.35, 229/406, 407; 53/403, 456, 478, 485; 156/69; 426/129; 428/34.2

(56) References Cited

U.S. PATENT DOCUMENTS

| | | | |
|---|---|---|---|
| 3,656,682 A | * | 4/1972 | Guiliani ......................... 53/478 |
| 3,715,856 A | * | 2/1973 | Borel ............................ 156/69 |
| 3,863,832 A | * | 2/1975 | Gordon et al. ............. 229/125.35 |
| 4,026,458 A | * | 5/1977 | Morris et al. ................. 229/406 |
| 4,183,435 A | * | 1/1980 | Thompson ................... 229/407 |
| 4,355,755 A | * | 10/1982 | Faller ...................... 229/125.35 |
| 4,456,164 A | * | 6/1984 | Foster et al. ................. 229/406 |
| 4,722,474 A | * | 2/1988 | Dropsy ................... 229/125.35 |
| 5,345,747 A | * | 9/1994 | Raque et al. .................. 53/478 |
| 5,418,008 A | * | 5/1995 | Calvert ........................ 427/203 |
| 5,425,972 A | * | 6/1995 | Calvert ........................ 428/34.2 |
| 5,718,101 A | * | 2/1998 | Noel et al. ..................... 53/478 |
| 6,093,460 A | * | 7/2000 | Iwaya ........................ 229/406 |

FOREIGN PATENT DOCUMENTS

| | | | |
|---|---|---|---|
| EP | 419068 | * | 3/1991 |
| EP | 431348 | * | 6/1991 |
| EP | 729900 | * | 9/1996 |
| GB | 2115770 | * | 9/1983 |
| GB | 2123786 | * | 2/1984 |
| GB | 2280416 | * | 2/1995 |
| WO | WO-94/27868 A2 | * | 12/1994 |
| WO | WO-98/01363 A1 | * | 1/1998 |

* cited by examiner

*Primary Examiner*—Gary E. Elkins
(74) *Attorney, Agent, or Firm*—Antonelli, Terry, Stout & Kraus, LLP

(57) ABSTRACT

There is described a packing tray (2) mainly of cardboard, paper, or a laminate, e.g. extruded, primarily containing these materials and in particular intended as sales packing for foodstuffs, e.g. meat, sliced meat or vegetables, poultry, fish, fruit, vegetables, salads, pasta, dishes for dinner, bakery and dairy products, which tray preferably has a rectangular shape with rounded corner parts (8), a mainly plane bottom (14) and sloping side walls (16) which at the top continue in an annular edge (12) approximately extending in parallel with the bottom (14), which tray (2) consists of one moulded item, the upper side of which consists of a gas- and/or diffusion-proof coating having such barrier abilities that a covering film or a dome-shaped, e.g. transparent, lid (18) may be connected gas-proof or diffusion-proof to the said annular edge by welding. There is also described a method for making and using, respectively, the packing tray.

10 Claims, 1 Drawing Sheet

PACKING TRAY AND METHOD FOR ITS PRODUCTION AND USE

BACKGROUND OF THE INVENTION

FIELD OF THE INVENTION

The present invention relates to a packing tray substantially of cardboard or, for example, an extruded laminate containing these materials.

Packing trays which utilize cardboard or extruded laminates thereof are used to a very large extent as sales packings for fresh foodstuffs of almost any kind, and most often the packing tray is provided with a simple wrapping of cheap plastic film. When speaking of meat, poultry, and fish, the shelf life of such fresh goods is only very short, and according to present practice and rules, the sales period for ground meat is only one or two days. The sales period for sliced meat and fish is also only very few days, contributes to almost every supermarket necessarily having its own butchering department which is often not profitable at all based exclusively on turnover considerations.

GB-A-2 123 786 discloses a container in the form of a tray having a rim flange to which is heat-sealed a flexible first cover and a second cover of board material being attached to the first cover to strengthen the filled and sealed container. The second cover, which is preferably heat-sealed to the first, may have a window, and is removeable from the first cover without separation from the flange. The second cover may carry required printing instead of, as in many cases, put the sealed try inside a separate carton box simply to allow the outer carton to carry the required printing. However, by this known packaging container the sealing between the very thin first cover and the rim is only leakproof.

SUMMARY OF THE INVENTION

With this background, the invention has the purpose of providing an improved packing tray which may be a contributing factor for increasing, by way of example, the sales period for fresh foodstuffs, such as meat, ground meat, sliced meat and vegetables, poultry, salads and fish, and also may have other advantages.

The packing tray according to the invention has one press formed item, the upper side of which is a gas- and/or diffusion-proof coating having barrier abilities so that a covering film or a dome-shaped, e.g. transparent, lid may be connected in a gas-proof or diffusion-proof manner to the annular edge by welding, with the annular edge at the rounded corner parts being provided with bending lines, and the coating having a minimum thickness sufficient to ensure a smoothing and melting together of possible corrugations at the corner parts. By means of simple provisions there is hereby achieved a packing tray which is particularly suited for packing fresh foodstuffs, such as meat, minced meat, sliced meat and vegetables, poultry and fish, fruit, vegetables, salads, pasta, dinner dishes, bakery and dairy products. The packing tray makes possible the final top sealing of the packing tray and its content with simultaneous scavenging with a protective gas with the purpose of avoiding or reducing decomposition of the foodstuff, so that the keeping quality and hence the sales period of the foodstuffs concerned may be prolonged considerably.

The barrier qualities of the surface coating of the packing tray according to the invention together with the covering film and/or the lids provide a gas- and diffusion-proof barrier with a high barrier characteristic or with a low gas permeability. In practice, it is almost impossible to have a coating or a film covering completely impermeable to diffusion of aqueous vapour. Besides, in connection with meat, there is no real risk in practice of drying up as fresh meat gives off humidity However, it is of great significance to minimize diffusion of humidity out of the packing tray according to the invention.

In a simple way the tray according to the invention ensures that a final top sealing with tightness is achieved along edge parts of the rounded corner parts provided with bending lines that extend transversely to the edge parts. The thickness of the coating ensures, a smoothing of local unevennesses at corner parts because of the transversely directed bending lines, i.e. the thickness of the coating at the subsequent top sealing of the packing tray also contributes to improving the welding and/or melting (adhesion) together at the corner parts.

Advantageously, the packing tray according to the invention may be thus designed so that the covering film is a peelable film, i.e. a film which is exceptionally easy to remove from the annular edge of the packing tray.

With the purpose of making it very spacious, the packing tray according to the invention may advantageously be thus designed so that dome-shaped lids are used with a correspondingly designed, inverted tray, which trays are welded together edge to edge. In other words, the total packing consists of two identically shaped packing trays which are welded in a gas-proof edge to edges manner.

The packing tray according to the invention may be thus designed as sales packing in an advantageous way so that tray, lid and possible paper laminated extruded covering film are provided with printing.

Furthermore the packing tray according to the invention may be thus designed so that the tray is a single press formed item with the upper side of which between the cardbord and the upper weldable barrier coating provided with a susceptor coating. Thereby it is possible to achieve longer shelf life and at the same time a faster and more even cooking in a microwave oven.

The packing tray according to the invention may, by way of example, be used for prepared dinner dishes so that the tray is a single press formed item having a substantially round, elliptical or oval tray shape.

Furthermore, the invention concerns a method for making a packing tray out of sheet- or roll-shaped material layer of a cardboard material, which is laminated, coated or provided with coating by extrusion with the surface coating of material being weldable, which method punches the tray from blanks of material, the shape of which correspond to the packing tray, that preferably before punching have bending lines embossed at corner parts of the blanks of material, and that thereafter are press formed by means of a press forming tool, which is preferably a heated press forming tool. Any possible projecting material is cut off the annular edge of the finished packing trays.

The method according to the invention may advantageously be modified by using a material with a thick surface coating, which at the subsequent press forming by means of heat and/or friction, ensures a smoothing and melting together of the bending lines at the corner parts of the annular edge at least.

The invention also concerns a method for using a packing tray, for sales packing for foodstuffs, where one or more food items, e.g. a recently slaughtered chicken, is placed on the tray. The method covers the foodstuffs by a weldable, gas-proof film which is welded to the annular edge of the packing tray, preferably with simultaneous scavenging with a protective gas.

An alternative method for using a packing tray is, for example for sales packing of foodstuffs, where one or more food items, e.g. a portion of ground flesh or meat, is placed on the tray, wherein the foodstuffs are covered by means of a dome-shaped, transparent plastic lid which is welded to the annular edge of the packing tray, preferably with simultaneous scavenging with a protective gas.

A further alternative method for using a packing tray is, for example for sales packing for foodstuffs, e.g. prepared dinner dishes, where a portion of foodstuffs are placed on the tray, wherein the foodstuffs are covered by means of a dome-shaped lid of a correspondingly shaped, inverted tray, so that the trays are welded together at the annular edge, preferably with simultaneous scavenging with a protective gas.

BRIEF DESCRIPTION OF THE DRAWINGS

The invention is explained in more detail in the following with the drawing, on which.

DESCRIPTION OF THE PREFERRED EMBODIMENTS

Figure 1:
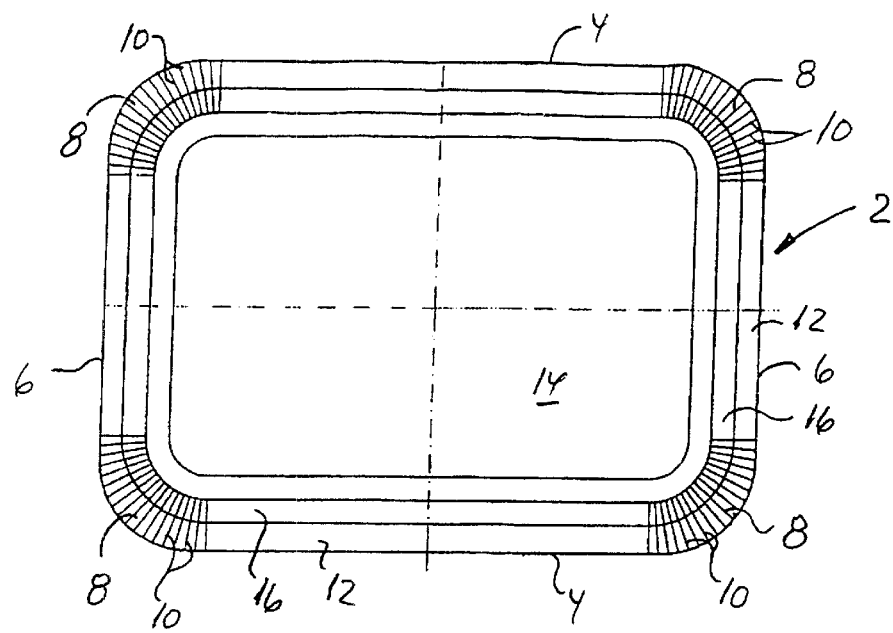
FIG. 1 shows a top view of an embodiment of a packing according to the invention.

The packing tray 2 has a shape known which is mainly rectangular with mutually parallel longer sides 4 and shorter sides 6 and with rounded corner parts 8, each being designed with a large number of bending lines 10. These bending lines 10 at the corner parts 8 also extend over an annular, outward bent edge 12 which is substantially in parallel with a plane bottom 14. A slightly outward/upward sloping side wall 16 extends between the plane bottom and the annular edge 12. The bending lines 10 at the corner parts 8 have the purpose of making easier press forming the packing tray 2 out of a previously punched plane blank of material without any breakage occurring in the blank which may be punched out from a sheet or roll shaped layer of material.

The packing tray 2 is made of cardboard, or preferably a laminate containing cardboard. The packing tray 2 is developed particularly for use for fresh foodstuffs, e.g. meat, sliced meat or vegetables, poultry, fish, fruit, vegetables, salads, pasta, dinner dishes, bakery and dairy products and preferably there is used a laminated material of core material substantially of cardboard that either by coating or extrusion is provided with a suitable surface coating which at the side coming into contact with the foodstuff is a gas-proof, weldable coating. The external side or the underside of the packing tray or the material layer may optionally be impregnated in order to make the external side or the underside less absorbing.

By means of the upper weldable coating of the tray 2, it becomes very easy to seal of the packing tray 2 at the top—when the foodstuff has been placed on this—by means of a gas-proof, weldable plastic film extending over the foodstuff e.g. a chicken, and which is welded to the annular edge 12 while scavenging with a protective gas, so that an efficiently sealed and presentable sales packing with exceptionally long keeping qualities (shelf life) is formed.

The welding together may take place by means of a welding tool with a welding sole with a protruding edge so that welding together only takes place along the edge, or there may be used a plane welding plate. In order to ensure that welding is made correctly and gas-proof also at the corner parts 8 with the bending lines 10, welding soles or welding plates with mutually co-operating projecting edges, grooves or lamellae may be used.

Figure 2:
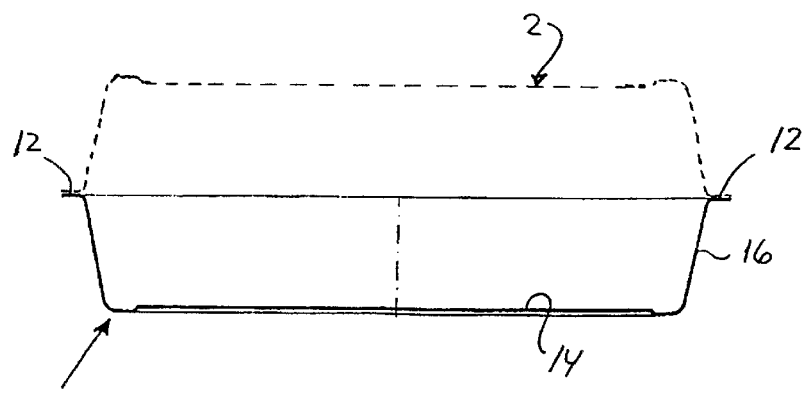
FIG. 2 shows a longitudinal section of the packing tray shown in FIG. 1.

In FIG. 2 showing a longitudinal section through the packing tray 2, there is furthermore shown with a stippled line that two identically shaped packing trays 2 welded together edge to edge may form a packing with a relatively large capacity.

Figure 3:
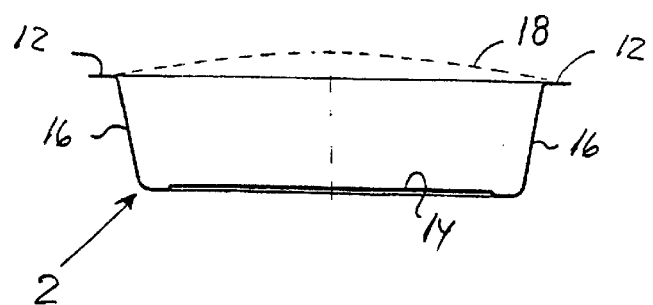
FIG. 3 shows a transverse section of the packing tray shown in FIG. 1.

In FIG. 3 showing a cross section through the packing tray 2, there is furthermore shown with a stippled line that the packing tray 2 may be provided with a preferably rigidly dome-shaped lid 18 which, for example, may be transparent and printed.

The surface coating of the packing tray may advantageously have several layers, namely a lower hard cardboard layer and an upper soft weld layer which during the press forming process melts together by means of heat or friction so that also the bending lines in the corner areas are smoothed out with certainty and welded together in a gas-proof way.

For use as packing for prepared dinner dishes and other foodstuffs like pizzas and other dough items which are often cooked in a microwave oven, it may be suitable that at least the side of the cardboard or paper material constituting the inner side of the packing tray is coated with a susceptor coating of a hard plastic layer, e.g. PET or PEN, toward the cardboard or paper material, and which at the opposite side is a soft weld coating. Thereby it is possible to achieve longer shelf life and at the same time a faster and more even baking in the microwave oven. It may also be advantageous that the lid at the inner side is provided with a susceptor coating.

It should be noted that it is within the scope of the invention to design the packing tray with any other form than the described substantially rectangular shape. For example, the packing tray according to the invention may be designed with substantially circular or substantially elliptical shape. A possible alternative form of the packing tray according to the invention may have multiple compartments which may be arranged to be individually sealed with one of the coverings, optionally including scavenging with protective gas (MAP or CAP) during the sealing procedure.

What is claimed is:

1. A packing tray comprising:
the packing tray including a plane bottom, sloping side walls extending upward from the plane bottom to an annular edge including rounded corner parts provided with bending lines and extending approximately in parallel with the bottom and being formed from one of cardboard, paper, or a laminate of cardboard or paper, a gas-proof weldable surface coating disposed on the plane bottom, sloping sidewalls and the annular edge of a thickness on the annular edge sufficient to provide a top surface smoothing the bending lines to sealing with a tray top, the tray top comprising a gas proof layer which, upon packaging of foodstuffs therein, is connected in a gas-proof manner to the annular edge by adhesion to seal the foodstuffs therein in a gas tight manner to an outside atmosphere.

2. A packing tray according to claim 1, wherein the tray top comprises a covering film which is peelable from the annular edge of the packing tray.

3. A packing tray according to claim 1, wherein at least one of the tray and the tray top is provided with print.

4. A packing tray according to claim 2, wherein at least one of the tray and the tray top is provided with print.

5. A packing tray according to claim 1, wherein the tray is press formed with an upper and inner side thereof between the cardboard, paper or laminate of cardboard or paper and the surface coating comprising a susceptor coating.

6. A packing tray according to claim 1, wherein the tray is press formed and is substantially round.

7. A packing tray according to claim 1, wherein the tray is press formed and is a substantially elliptical or oval in shape.

8. A method for production of a packing tray according to claim 1 wherein:

the tray is cardboard provided from one of a sheet or roll with the surface coating being provided by extrusion with blanks of cardboard of a shape corresponding to the packing tray being punched out with the bending lines embossed at corner parts of the blanks, which blanks thereafter are press formed into the tray by a press forming tool.

9. A method according to claim 8, wherein the surface coating by applied heat or friction smooths and melts the bending lines at the corner parts of the annular edge.

10. A use of a packing tray according to claim 1, as a sales packing for foodstuffs, placed in the tray with the foodstuffs being covered by the tray top by welding to the annular edge of the packing tray while simultaneous scavenging an inside of the tray with a protective gas.

* * * * *